United States Patent [19]
Wnuk et al.

[11] Patent Number: 5,118,328
[45] Date of Patent: Jun. 2, 1992

[54] PROCESS FOR REGENERATING ADSORBERS

[75] Inventors: Ralf Wnuk, Marbach; Horst Chmiel, Leonberg, both of Fed. Rep. of Germany

[73] Assignee: Fraunhofer Gesellschaft, Fed. Rep. of Germany

[21] Appl. No.: 652,936

[22] Filed: Feb. 8, 1991

[30] Foreign Application Priority Data

Feb. 14, 1990 [DE] Fed. Rep. of Germany ....... 4004532

[51] Int. Cl.$^5$ .................... B01D 53/04; B01D 53/22
[52] U.S. Cl. ............................... 55/16; 55/26; 55/28; 55/68; 55/74
[58] Field of Search .................... 55/16, 25, 26, 68, 74, 55/158, 179, 180, 28

[56] References Cited

U.S. PATENT DOCUMENTS

| | | | |
|---|---|---|---|
| 4,104,039 | 8/1978 | Kuri et al. | 55/62 X |
| 4,229,188 | 10/1980 | Intille | 55/16 |
| 4,238,204 | 12/1980 | Perry | 55/16 |
| 4,336,159 | 6/1982 | Winter | 55/62 X |
| 4,414,003 | 11/1983 | Blaudszun | 55/179 X |
| 4,444,571 | 4/1984 | Matson | 55/16 |
| 4,553,983 | 11/1985 | Baker | 55/16 |
| 4,645,516 | 2/1987 | Doshi | 55/26 X |
| 4,738,694 | 4/1988 | Godino et al. | 55/179 X |
| 4,755,299 | 7/1988 | Brüschke | 55/16 X |
| 4,765,804 | 8/1988 | Lloyd-Williams et al. | 55/25 X |
| 4,783,203 | 11/1988 | Doshi | 55/26 X |
| 4,859,216 | 8/1989 | Fritsch | 55/180 X |
| 4,895,989 | 1/1990 | Sander et al. | 55/16 X |
| 4,906,256 | 3/1990 | Baker et al. | 55/16 |
| 4,929,357 | 5/1990 | Schucker | 55/16 X |
| 4,994,094 | 2/1991 | Behling et al. | 55/16 |
| 5,004,482 | 4/1991 | Haas et al. | 55/16 |
| 5,015,365 | 5/1991 | Vara et al. | 55/16 X |

FOREIGN PATENT DOCUMENTS

| | | |
|---|---|---|
| 2936873A1 | 4/1981 | Fed. Rep. of Germany . |
| 3518871A1 | 3/1986 | Fed. Rep. of Germany . |
| 3726431A1 | 2/1989 | Fed. Rep. of Germany . |
| 2580947 | 10/1986 | France . |

*Primary Examiner*—Robert Spitzer
*Attorney, Agent, or Firm*—Ostrolenk, Faber, Gerb & Soffen

[57] ABSTRACT

The present invention relates to a process for regenerating adsorbers as used in solvent recovery, for example. Regeneration is effected in that the adsorbed substances are desorbed according to known processes and a gaseous desorbate stream is produced, that the gaseous desorbate stream is fed into one or several pervaporation modules, that the desorbed substances in the pervaporation modules are removed from the desorbate stream by gas permeation via semi-permeable solubility diffusion membranes, and that the reduced desorbate stream is recirculated to the adsorber. Preferred embodiments of the process according to this invention use heatable solubility diffusion membranes. A recovery of the desorbate stream is rendered possible by the process according to this invention, which does not imply a change in state of the entire desorbate stream.

12 Claims, 1 Drawing Sheet

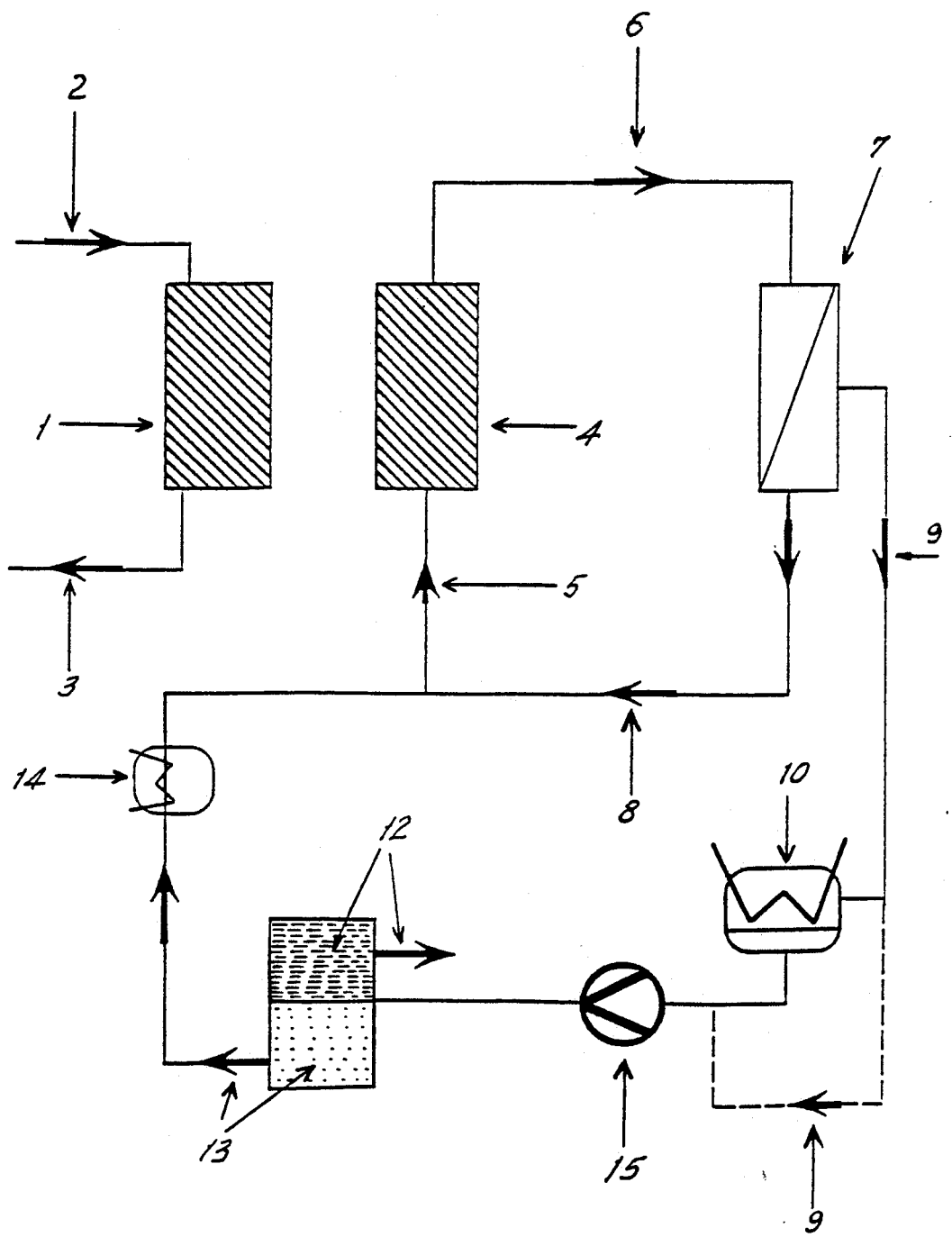

PROCESS FOR REGENERATING ADSORBERS

The present invention relates to a process for regenerating adsorbers such as used in solvent recovery, for example.

Adsorption is frequently the only alternative to purify large amounts of outlet air of lower concentrations loaded with solvents, e.g. 1–50 g/m$^3$ of solvent, as occurs in adhesive, strip or film production, in the printing industry or dry-cleaning shops, to the limiting values stipulated in the desorbate TA-Luft (technical standard concerning the particles in the air). For example, activated carbons or silica gels are used as adsorbents. In the various adsorption processes, collection or recovery of solvents alternates between adsorption of the solvent at the adsorbent and subsequent desorption. In this connection, desorption represents the most complicated and cost-effective step. Therefore, the costs of regeneration or, in case of emergency, of the disposal of the charged adsorbent restrict its field of application.

Regeneration is effected either thermally, by means of temperature-change processes, or by pressure reduction, in pressure-change processes, or by displacement methods by means of desorbing agents. In all cases, a purge gas, usually water vapor, or an inert gas such as nitrogen, for example, is used to discharge the desorbed solvent from the adsorbent. Then, the desorbate stream is further treated by separating the solvent from the purge gas.

The solvent is usually recovered and separated from the desorbate stream in that the state of the solvent is changed by compression or temperature change which renders possible a separation of the solvent from the desorbate stream. The enthalpy requirement necessary for changing the state of the solvent results from the solvent amount and the specific enthalpy necessary for the corresponding change in state.

However, a considerable drawback of all of these processes is that the actually necessary enthalpy charge is manifoldly higher because the entire desorbate stream is simultaneously subjected to such a change in state. This is why the energy consumption required for desorption is so high.

In order to prevent a release of the desorption gases towards the outside, they are frequently recirculated to the adsorber to be regenerated. The desorbed solvent is separated by condensation. If water vapor is used as the purge gas, the condensate will accumulate in a liquid phase, and depending on the solvent, various processes are then used for the separation of water and solvent.

Proposals for thermal regeneration by means of hot gas are known from FR 2580947 A1, for example. In this citation, the solvent is separated from the desorbate stream by means of a cold trap, the desorbate stream then being heated again to desorption temperature. Cooling and re-heating requires a very high energy demand, so that regeneration is very expensive.

In investigations made with respect to the adsorption capacity of activated carbon and its regeneration, chargings of the activated carbon of 0.2 to 0.4 kg of solvent per kg of activated carbon are reached depending on the solvent and inlet concentrations which may range from 1–40 g/m$^3$. The outlet concentration of the outlet air is at the order of 20 mg/m$^3$. The purge gas amounts used for regeneration can be reduced in the process control for the water vapor regeneration to 3 to 6 kg of vapor per kg of solvent.

For example, in EP 0030921 B1 tests for the adsorption of 1,2,4-trichlorobenzene on silica gel were made with other adsorbents, which have a ratio of vapor to solvent amount of 1.6:3. It results from these investigations that the conventional, achievable solvent concentrations in the purge gas stream (desorbate stream) are at about 25% by weight.

In order to increase the capacity of the adsorbent, the solvent content will have to be kept at a low level prior to its new entrance into the adsorber if the purge gas stream is recirculated. The residual solvent content admissible for a sufficient desorption results from the physical properties of the adsorbent, the moisture content of the outlet air and the requirements applying in the individual case. Thus, it has to be aspired to reduce the purge gas stream (desorbate stream) to residual solvent contents of less than 1% by weight. A serious drawback of all known processes for the purification of desorbate streams consists in the fact that they require a process-engineering treatment of the entire desorbate stream.

Therefore, it is the object of the present invention to provide a process which enables a recovery of the desorbate stream and keeps the costs for the energy supply as low as possible. Furthermore, the process shall be applicable to all adsorption and regeneration processes, and a continuous process control is to be enabled with this process.

This problem is solved in that the adsorbed substances are desorbed according to known processes, a gaseous desorbate stream is produced, the gaseous desorbate stream is fed into one or several pervaporation modules, the desorbed substances in the pervaportion modules are removed from the desorbate stream by gas permeation via semi-permeable solubility diffusion membranes, and the reduced desorbate stream is recirculated to the adsorber.

As compared to the prior art, the process according to this invention has the advantage that it avoids a temperature change and/or a change in state of the entire desorbate stream when the desorbate stream is further treated. In order to separate the desorbed substances from the desorbate stream and further treat the latter, it is not the entire desorbate stream that is cooled or condensed but only the permeate of the gas permeation, so that, after the separation of the desorbed substances, the reduced desorbate stream does no longer have to be heated and/or evaporated when it shall be used again as a purge gas stream. This enables a tremendous energy reduction of up to 80%, and as a result the process according to this invention is by far superior to conventional regeneration methods from an economic point of view. Since the regeneration process according to this invention is carried out in a closed circulation system, no environmental problems will occur at a later date.

Since the process according to this invention has a modular design, it is highly flexible with respect to the varying amounts of outlet air and varying concentrations of pollutants in the outlet air. In the known processes according to the prior art, however, an energetically satisfactory adaptation is only possible with considerable technical means. Due to the modular design of the pervaporation unit the process according to this invention enables an adaptation here as well thereby adding to the flexibility of the entire process.

The process according to this invention can be applied to all conventional regeneration processes in which gaseous desorbate streams result. For example, such desorbate streams may develop by increasing the temperature of the adsorbent using a hot inert gas stream, furthermore by reducing the pressure in the adsorber, combined with purging by means of inert gas, or by desorpting the adsorbed substances by means of a desorbant. Furthermore, the process according to this invention can be used for all conventional adsorption processes, such as fixed-bed processes, and processes having moving or powderized adsorbants. All conventional purge gases, such a water vapor or nitrogen, for example, may be used as the inert gas for purging.

If the desorbate stream contains a substance mixture which is to be separated and/or splitted, this separation can be effected in that the desorbate stream is fed through several pervaporation modules in succession, each pervaporation module being equipped with a membrane semi-permeable for one component of the substance mixture each.

All temperature-resistant membranes are suitable as solubility diffusion membranes, the correspondingly usable membranes depending on the specific application, the temperature and kind of desorbed and/or permeating substances. Preferred embodiments of the process according to this invention use solubility diffusion membranes having a porous substructure.

For example, the promoting partial pressure decrease in the pervaporation module can be produced for the permeating substances by generating a reduced pressure on the rear side of the solubility diffusion membrane or by feeding a carrier gas stream past the rear side of the solubility diffusion membrane, which removes the permeate from the membrane as described in DE-OS 3726431, for example. With suitably selected membrane selectivity, the desorbed substance is the preferably permeating component enriching in the permeate. If there is an interest in obtaining a permeate stream enriched with desorbed substances, it will be useful to produce the partial pressure decrease by means of reduced pressure.

In order to prevent partial condensation of the desorbate stream in the pervaporation module, the membrane is heated in another embodiment of the process according to this invention, so that the membrane has a higher temperature than OS 3518871. A condensation of the desorbate stream results in a laminar boundary layer on the membrane, serving to increase its transport resistance. Furthermore, a condensation on the membrane can cause considerable problems when controlling the entire process because the operating parameters, i.e. the permeate flow, transmembrane pressure and permeate composition, may change drastically when a laminar boundary layer forms.

FIGURE 1 shows the process according to this invention by the example of a purification of the solvent-containing outlet air and a regeneration using water vapor as the purge gas stream.

The process according to this invention is explained in detail by means of a thermal regeneration process in which organic solvents (gasoline vapors) are removed from the outlet air by adsorption and which uses water vapor as the purge gas, and by means of FIGURE 1. Absorber A (1) is switched to adsorption; the solvent-containing outlet air (2) is fed into the adsorber A (1) which it leaves as pure air (3). The water vapor stream (5) flows through the depleted absorber B (4) at desorption temperature and heats it. The water vapor stream (desorbate stream) (6) which is strongly enriched with solvent (25% by weight) is fed directly into the pervaporation module (7) at a temperature of 120° C. and a pressure of 2 bar, in which the desorbate stream is reduced to 5% by weight by means of gas permeation. The thus reduced water vapor stream (8) leaves the pervaporation module and is again supplied to the adsorber B (4).

If water vapor is used as the purge gas stream and if the adsorbed and/or desorbed substances are organic solvents, two process variants will be possible for the further permeate treatment as a function of the boiling point of the solvents, since direct condensation of the permeate proves to be unfavorable for very low boiling points. The two process variants are explained in detail by means of water vapor stream as the purge gas stream and the production of the partial pressure decrease by reduced pressure. In this connection, it has to be taken into consideration that part of the purge gas stream always migrates through the semi-permeable membrane.

Variant 1

Variant 1 is illustrated in FIGURE 1 by way of a diagram. The resulting, water vapor-containing permeate (9) is condensed upstream the vacuum pump (15) in a condensor (10) and separated into two phases in a settler (11). The organic phase (12) is drawn off and directly re-used. The aqueous phase (13) having a very low solvent content is drawn off, evaporated in an evaporator (14) and again supplied to the desorbate circulation. The advantage of this process control is that the vacuum pump (15) may have comparably small dimensions, since the vacuum is maintained by the volume contraction of the condensate and the delivery of the vacuum pump has only to be designed for the corresponding liquid condensate volume.

Variant 2

Variant 2 is shown in FIGURE 1 in dashed line. If the boiling point of the solvent is very low at permeate pressure, this can render economic condensation impossible. In this case, the permeate (9) is compacted via the vacuum pump (15). It condenses and separates into two phases in a settler (13). The aqueous and organic phases are further treated as described a process variant 1.

If desorption is effected by a temperature increase of the adsorbent, this will provide an additional possibility to save energy, since the evaporator (14) is heated by inner thermal coupling with the adsorber B (4) in another embodiment of the process according to this invention, if this adsorber is cooled again to operating temperature after the desorption.

We claim:

1. A process for regeneration of an adsorber, comprising the steps of desorbing adsorbed solvent substances and producing a gaseous desorbate stream, feeding the gaseous desorbate stream into at least one pervaporation module, removing the desorbed solvent substances from the desorbate stream by gas permeation of the solvent substance through a semi-permeable solubility diffusion membrane, and recirculating the desorbate stream to the adsorber.

2. The process according to claim 1, wherein the gaseous desorbate stream is produced by a temperature increase using a hot inert gas stream.

3. The process according claim 1 wherein the gaseous desorbate stream is produced by a pressure decrease in the adsorber and by purging the adsorber with an inert gas.

4. The process according to claim 3, wherein the inert purge gas used is water vapor.

5. The process according to claim 4, wherein water vapor-containing permeate is supplied into a condenser and allowed to condense, the condensate is fed into a settler and separated into an aqueous phase and a phase immiscible with water, and wherein the aqueous phase is drawn off, evaporated and supplied to the desorbate.

6. The process according to claim 4 wherein water vapor-containing permeate is compacted via a vacuum pump and allowed to condense, the condensate is fed into a settler and separated into an aqueous phase and a phase immiscible with water, and wherein the aqueous phase is drawn off, evaporated and supplied to the desorbate.

7. The process according to claim 1, wherein the gaseous desorbate stream is produced by desorbing the adsorbed substances by means of desorbant.

8. The process according to claim 1, wherein a partial pressure decrease for the desorbed substances is produced in the pervaporation module by applying a reduced pressure on a permeate side of the solubility diffusion membrane.

9. The process according to claim 1, wherein a partial pressure reduction for the desorbed substances is produced in the pervaporation module by feeding a carrier gas stream in proximity to a rear wide of the membrane to remove the permeate.

10. The process according to claim 1, wherein the temperature of the solubility diffusion membrane is maintained above the temperature of the desorbate stream.

11. The process according to claim 10, wherein the membrane is a heatable membrane.

12. The process according to claim 1, wherein desorption is effected by a temperature increase and by purging the adsorber with an inert gas, purge-gas containing permeate is condensed, desorbed substances are separated and reduced, condensed purge gas is obtained, reduced, condensed purge gas is heated or evaporated in an evaporator, and energy required for heating or evaporating the purge gas is obtained by inner thermal coupling from cooling the adsorber to operating temperature.

* * * * *